United States Patent [19]

Nukada et al.

[11] Patent Number: 5,302,710
[45] Date of Patent: Apr. 12, 1994

[54] PHTHALOCYANINE MIXED CRYSTAL AND ELECTROPHOTOGRAPHIC PHOTORECEPTOR CONTAINING THE SAME

[75] Inventors: Katsumi Nukada; Akira Imai; Katsumi Daimon; Masakazu Iijima, all of Minami-ashigara, Japan

[73] Assignee: Fuji Xerox Co., Ltd., Tokyo, Japan

[21] Appl. No.: 927,967

[22] Filed: Aug. 11, 1992

[30] Foreign Application Priority Data

Aug. 16, 1991 [JP] Japan .................................. 3-229688

[51] Int. Cl.$^5$ ........................ C09B 47/04; C09B 47/32
[52] U.S. Cl. .................................... 540/140; 540/141; 430/78
[58] Field of Search .................... 540/140, 141; 430/78

[56] References Cited

FOREIGN PATENT DOCUMENTS

| | | |
|---|---|---|
| 54-44684 | 12/1979 | Japan . |
| 55-27593 | 7/1980 | Japan . |
| 59-155851 | 9/1984 | Japan . |
| 60-59355 | 4/1985 | Japan . |
| 1-221459 | 9/1989 | Japan . |
| 2-170166 | 6/1990 | Japan . |
| 2-280169 | 11/1990 | Japan . |
| 3-9962 | 1/1991 | Japan . |

Primary Examiner—Richard L. Raymond
Attorney, Agent, or Firm—Oliff & Berridge

[57] ABSTRACT

A phthalocyanine mixed crystal comprising a halogenated indium phthalocyanine and a halogenated gallium phthalocyanine and an electrophotographic photoreceptor containing the phthalocyanine mixed crystal. The phthalocyanine mixed crystal is a charge generating material which provides an electrophotographic photoreceptor excellent in sensitivity, stability on repeated use, and environmental stability.

11 Claims, 7 Drawing Sheets

2θ

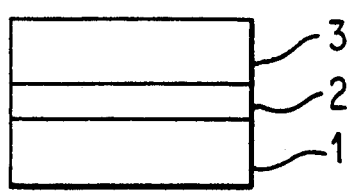
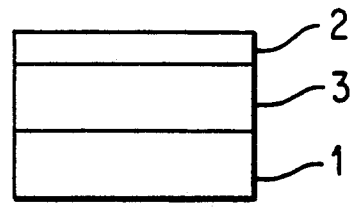
FIG. 13a          FIG. 13b
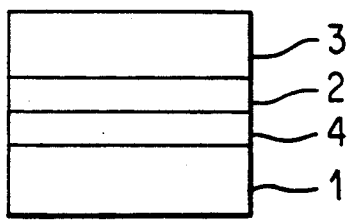
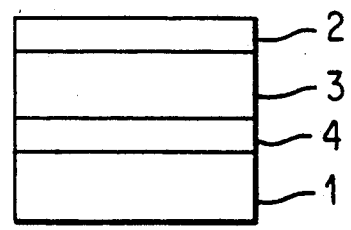
FIG. 13c          FIG. 13d
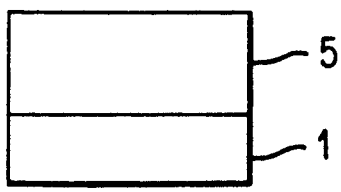
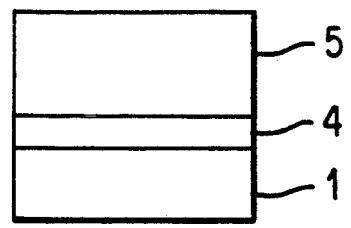
FIG. 14a          FIG. 14b

PHTHALOCYANINE MIXED CRYSTAL AND ELECTROPHOTOGRAPHIC PHOTORECEPTOR CONTAINING THE SAME

FILED OF THE INVENTION

This invention relates to a mixed crystal of a halogenated indium phthalocyanine and a halogenated gallium phthalocyanine, as well as an electrophotographic photoreceptor containing the same as a charge generating material.

BACKGROUND OF THE INVENTION

Known charge generating materials having sensitivity in the near infrared region which can be used in electrophotographic photoreceptors include squarylium pigments, bisazo pigments, and phthalocyanine pigments. Of these materials, phthalocyanine pigments have recently been attracting particular attention because of their high sensitivity, and various species thereof having different crystal forms have hitherto been proposed for use as a charge generating material of electrophotographic photoreceptors. For example, chloroindium phthalocyanine having a $\beta$-crystal form is disclosed in JP-A-59-155851 (the term "JP-A" as used herein means an "unexamined published Japanese patent application"). JP-A-60-59355 reports that chloroindium phthalocyanine having a specific crystal form is effective as a charge generating material. Further, JP-A-1-221459 describes that gallium phthalocyanine having a specific crystal form is also effective as a charge generating material.

JP-A-2-170166 and JP-A-2-280169 disclose that a mixed crystal of two or more species of phthalocyanines or a simple mixture of two or more species of phthalocyanine crystals is useful as a charge generating material of an electrophotographic photoreceptor.

However, a mixed crystal of a halogenated indium phthalocyanine and a halogenated gallium phthalocyanine has not yet been reported.

While the above-described known phthalocyanine species and mixed crystals thereof are useful as a charge generating material, all of them are still unsatisfactory. For example, the chloroindium phthalocyanine having a $\beta$-crystal form disclosed in JP-A-59-155851 supra exhibits very high sensitivity but is still insufficient in dark decay, stability on repeated use, crystal form stability in a coating composition, and dispersibility in a coating composition. In order to settle these problems, it has been proposed to incorporate a small amount of a substituted phthalocyanine as described, e.g., in JP-A-3-9962, JP-B-55-27583, and JP-B-54-44684 (the term "JP-B" as used herein means an "examined published Japanese patent application"). In this case, however, since a substituted phthalocyanine incorporated is markedly different from unsubstituted phthalocyanine in crystal form, mixing them gives rise to another problem, such as reduction in electrophotographic characteristics.

SUMMARY OF THE INVENTION

Accordingly, an object of the present invention is to provide a mixed crystal containing chloroindium phthalocyanine which is suitable for producing an electrophotographic photoreceptor having excellent stability on repeated use and excellent environmental stability.

Another object of the present invention is to provide an electrophotographic photoreceptor excellent in stability on repeated use and stability to environment.

Other objects and effects of the present invention will be apparent from the following description.

The inventors have conducted extensive investigations on crystal forms of various phthalocyanine complexes with the purpose of developing an electrophotographic photoreceptor excellent in electrophotographic characteristics and productivity. As a result, it has been found that there is a similarity in crystal form between a halogenated indium phthalocyanine and a halogenated gallium phthalocyanine, which makes it possible to obtain a mixed crystal therefrom. It has been confirmed that such a novel mixed crystal is excellent in crystal form stability, dispersibility, and sensitivity and therefore quite suited for use in electrophotographic photoreceptors.

The present invention relates to a phthalocyanine mixed crystal comprising a halogenated indium phthalocyanine and a halogenated gallium phthalocyanine.

The present invention also relates to an electrophotographic photoreceptor comprising a conductive substrate having formed thereon a photosensitive layer containing the above phthalocyanine mixed crystal.

BRIEF DESCRIPTION OF THE ACCOMPANYING DRAWINGS

Figure 1:
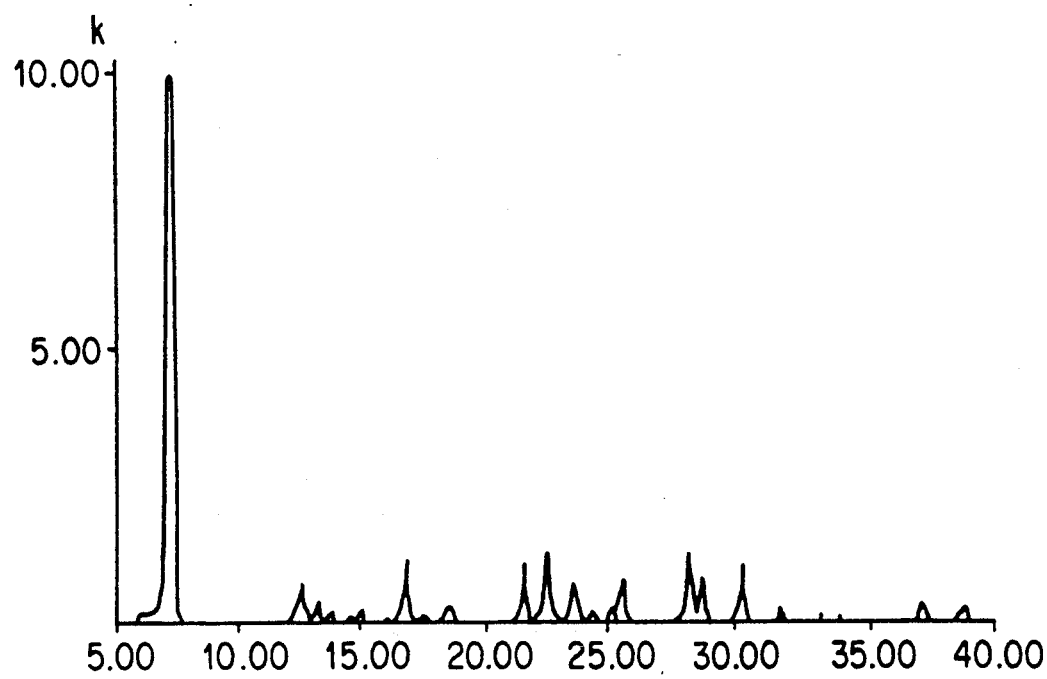
FIG. 1 is a powder X-ray diffraction pattern of a chloroindium phthalocyanine crystal.

FIGS. 13 and 14 each schematically illustrate the layer structure of the electrophotographic photoreceptor of the present invention.

DETAILED DESCRIPTION OF THE INVENTION

While examples of the halogen atom in the halogenated indium phthalocyanine or halogenated gallium phthalocyanine includes a chlorine atom, a bromine atom, and an iodine atom, chloroindium phthalocyanine and chlorogallium phthalocyanine are preferred.

The mixed crystal comprising a halogenated indium phthalocyanine and a halogenated gallium phthalocyanine according to the present invention preferably includes those having distinct X-ray diffraction peaks at Bragg angles ($2\theta \pm 0.2°$) of 7.0°, 7.4°, 17.4°, 23.7°, and 27.0° and those having distinct X-ray diffraction peaks at Bragg angles ($2\theta \pm 0.2°$) of 7.4°, 16.7°, 25.4°, and 28.1°.

The ratio of the halogenated indium phthalocyanine to the halogenated gallium phthalocyanine in the mixed crystal of the present invention is generally from 30/70 to 70/30 by weight, and preferably from 40/60 to 60/40 by weight.

In the present invention, the X-ray diffraction pattern is the measurement results of intensities of the Bragg angle ($2\theta$) with respect to CuK$_\alpha$ characteristic X-ray (wavelength: 1.541 Å). The measurement conditions are as follows:

Apparatus: X-ray diffractiometer (RAD-RC produced by Rigaku K.K.)
Target: Cu (1.54050 Å)
Voltage: 40.0 KV
Stars angle: 5.00 deg
Stop angle: 40.00 deg
Step angle: 0.020 deg The phthalocyanine mixed crystal according to the present invention can be prepared by using a halogenated indium phthalocyanine and a halogenated gallium phthalocyanine.

A halogenated indium phthalocyanine and a halogenated gallium phthalocyanine may be synthesized by known processes, such as a process comprising reacting a trihalogenated indium or a trihalogenated gallium with phthalonitrile or diiminoisoindoline in an appropriate organic solvent.

In the preparation of the phthalocyanine mixed crystal of the present invention, a halogenated indium phthalocyanine and a halogenated gallium phthalocyanine are mixed at an appropriate ratio, and the mixture is ground by dry grinding or milling (e.g., salt milling) in a ball mill, a sand mill, a kneader, a mortar, etc. until the mixture becomes amorphous, i.e., the X-ray diffraction spectrum of the ground mixture reveals no distinct peak. Alternatively, each of the starting phthalocyanine compounds is separately ground to become amorphous and then mixed together. Then, the resulting amorphous mixture is treated with an organic solvent to obtain the mixed crystal of the present invention. Examples of useful organic solvents include halogenated hydrocarbons, e.g., methylene chloride and chloroform; aromatic hydrocarbons, e.g., toluene, benzene, and chlorobenzene; alcohols, e.g., methanol and ethanol; ketones, e.g., acetone and methyl ethyl ketone; acetic esters, e.g., ethyl acetate and butyl acetate; aliphatic hydrocarbons, e.g., hexane and octane; ethers e.g., diethyl ether, dioxane, and tetrahydrofuran (THF); ethylene glycol; dimethylformamide (DMF); and mixtures of these organic solvents, or mixtures of these organic solvents and water. The amount of the solvent to be used and the solvent treating time are not particularly limited.

It is effective that the above-described operation for obtaining a non-crystalline mixture be preceded by a treatment of the starting phthalocyanine compounds with a solvent, such as DMF, N-methylpyrrolidone (NMP), THF, methylene chloride, or sulfolane, to render the phthalocyanine compounds compatible with each other. It is also effective that the solvent treatment of the mixture be conducted while milling in a ball mill, a sand mill, etc.

The phthalocyanine mixed crystal of the present invention is useful as a charge generating material for electrophotography and provides an electrophotographic photoreceptor excellent in stability on repeated use and environmental stability.

Illustrative examples of the structure of the photoreceptor using the phthalocyanine mixed crystal of the present invention are explained below by referring to FIGS. 13 and 14.

FIGS. 13-(a) through (d) show schematic cross sections of photoreceptors having a photosensitive layer of a laminate structure. The photoreceptor shown in FIG. 13-(a) is composed of conductive substrate 1 having thereon charge generating layer 2 and charge transporting layer 3 in this order. The photoreceptor shown in FIG. 13-(b) is composed of conductive substrate 1 having thereon charge transporting layer 3 and charge generating layer 2 in this order. The photoreceptors shown in FIGS. 13-(c) and (d) additionally have subbing layer 4 on conductive substrate 1. FIGS. 14-(a) and (b) show schematic cross sections of photoreceptors having a photosensitive layer of a single layer structure, in which photoconductive layer 5 is provided on conductive substrate 1 with or without subbing layer 4.

Where a photoreceptor has a laminate structure, in which the photosensitive layer comprises a charge generating layer and a charge transporting layer, as shown in FIG. 13, the charge generating layer may comprise the phthalocyanine mixed crystal of the present invention and a binder resin. The binder resin can be selected from a wide range of insulating resins or organic photoconductive polymers, e.g., poly-N-vinyl carbazole, polyvinyl anthracene, and polyvinyl pyrene. Examples of suitable binder resins include insulating resins, such as polyvinyl butyral, polyarylates (e.g., a polycondensate of bisphenol A and phthalic acid), polycarbonates, polyesters, phenoxy resins, vinyl chloride-vinyl acetate copolymers, polyvinyl acetate, acrylic resins, polyacrylamide, polyamides, polyvinyl pyridine, cellulose resins, urethane resins, epoxy resins, casein, polyvinyl alcohol, and polyvinyl pyrrolidone.

The charge generating layer is formed by coating on a conductive substrate a coating composition prepared by dispersing the phthalocyanine mixed crystal of the present invention in a solution of the binder resin in an organic solvent. A compounding ratio of the phthalocyanine mixed crystal to the binder resin generally ranges from 40/1 to 1/10, and preferably from 10/1 to /1:4, by weight. If the ratio of the phthalocyanine mixed crystal is too high, the stability of the coating composition tends to be reduced. If it is too low, the sensitivity of the charge generating layer tends to be reduced.

The solvents to be used in the coating composition are preferably selected from those incapable of dissolving the lower layer, i.e., the layer on which the charge generating layer is provided. Examples of the organic solvents include alcohols, e.g., methanol, ethanol, and isopropanol; ketones, e.g., acetone, methyl ethyl ketone, and cyclohexanone; amides, e.g., N,N-dimethylformamide and N,N-dimethylacetamide; dimethyl sulfoxides; ethers, e.g., tetrahydrofuran, dioxane, and ethylene glycol monomethyl ether; esters, e.g., methyl acetate and ethyl acetate; halogenated aliphatic hydrocarbons, e.g., chloroform, methylene chloride, dichloroethylene, carbon tetrachloride, and trichloroethylene; and aromatic hydrocarbons, e.g., benzene, toluene, xylene, ligroin, monochlorobenzene, and dichlorobenzene.

The coating composition for a charge generating layer can be coated by any known coating technique, such as dip coating, spray coating, spinner coating, bead coating, wire bar coating, blade coating, roller coating, and curtain coating. Drying after coating is preferably carried out first by drying at room temperatures to the touch and then heat-drying. Heat-drying may be performed at a temperature of from 50° to 200° C. for a period of from 5 minutes to 2 hours in still air or in an air flow. The charge generating layer usually has a thickness of from about 0.05 to 5 μm.

The charge transporting layer of the laminate structure may comprise a charge transporting material and a binder resin. Any of known charge transporting materials including polycyclic aromatic compounds, e.g., anthracene, pyrene, and phenanthrene; compounds having a nitrogen-containing heterocyclic ring, e.g., indole, carbazole, and imidazole; pyrazoline compounds, hydrazone compounds, triphenylmethane compounds, triphenylamine compounds, enamine compounds, and stilbene compounds, may be employed.

Also included in usable charge transporting materials are photoconductive polymers, such as poly-N-vinyl carbazole, halogenated poly-N-vinyl carbazole, polyvinyl anthracene, poly-N-vinylphenyl anthracene, polyvinyl pyrene, polyvinyl acridine, polyvinyl acenaphthylene, polyglycidyl carbazole, pyrene-formaldehyde resins, and ethyl carbazole-formaldehyde resins. These photoconductive polymers may be used alone for formation of a charge transporting layer without the aid of a binder resin.

The same binder resins as used in the charge generating layer can be used in the charge transporting layer.

The charge transporting layer can be formed by coating a substrate with a coating composition comprising the above-described charge transporting material, a binder resin, and an organic solvent incapable of dissolving the lower layer. The solvent and the coating technique may be the same as described for the formation of the charge generating layer. A compounding ratio of the charge transporting material to the binder resin generally ranges from 5/1 to 1/5 by weight. The charge transporting layer usually has a thickness of from about 5 to 50 μm.

Where a photoreceptor has a single layer structure as shown in FIG. 14, the photosensitive layer is a photoconductive layer comprising a binder resin having dispersed therein a charge transporting material and the phthalocyanine mixed crystal according to the present invention. A compounding ratio of the charge transporting material to the binder resin preferably ranges from 1/20 to 5/1 by weight, and a compounding ratio of the phthalocyanine mixed crystal to the charge transporting material preferably ranges from about 1/10 to 10/1 by weight. The charge transporting material and binder resin to be used are the same as described above for the laminate structure. Formation of the photoconductive layer can be effected in the same manner as described above for the charge generating layer and the charge transporting layer.

Any of conventional conductive substrates known for electrophotographic photoreceptors can be used in the present invention.

If desired, a subbing layer may be provided on the conductive substrate. The subbing layer is effective for inhibiting injection of unnecessary charges from the conductive substrate thereby serving to enhance chargeability of the photosensitive layer. It also functions to increase adhesion between the photosensitive layer and the conductive substrate.

Example of materials constituting the subbing layer include polyvinyl alcohol, polyvinyl pyrrolidone, polyvinyl pyridine, cellulose ethers, cellulose esters, polyamides, polyurethanes, casein, gelatin, polyglutamic acid, starch, starch acetate, amino starch, polyacrylic acid, polyacrylamide, zirconium chelate compounds, zirconium alkoxide compounds, organozirconium compounds, titanyl chelate compounds, titanyl alkoxide compounds, organotitanium compounds, and titanium coupling agents. The subbing layer usually has a thickness of from about 0.05 to 2 μm.

The present invention is now illustrated by way of Synthesis Examples, Examples, and Comparative Examples, but it should be understood that the present invention is not deemed to be limited thereto. All the percents and parts are given by weight unless otherwise indicated. All the mixing ratios of solvents in mixed solvents are given by volume.

SYNTHESIS EXAMPLE 1

Thirty parts of 1,3-diiminoisoindoline and 12.3 parts of indium trichloride were added to 230 parts of quinoline, and the mixture was allowed to react at 200° C. for 5 hours in a nitrogen stream. The reaction mixture was filtered, and the filter cake was washed successively with acetone and methanol and dried to obtain 16.2 parts of a chloroindium phthalocyanine crystal. The powder X-ray diffraction pattern of the resulting chloroindium phthalocyanine crystal is shown in FIG. 1.

SYNTHESIS EXAMPLE 2

Figure 2:
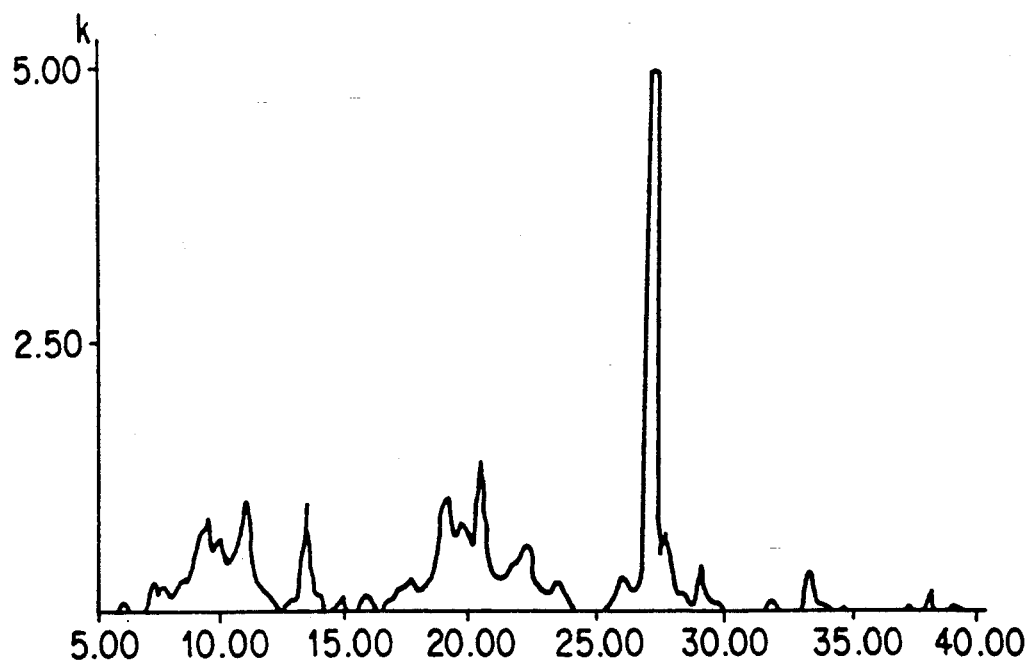
FIG. 2 is a powder X-ray diffraction pattern of a chlorogallium phthalocyanine crystal.

Thirty parts of 1,3-diiminoisoindoline and 9.1 parts of gallium trichloride were added to 230 parts of quinoline, and the mixture was allowed to react at 200° C. for 3 hours in a nitrogen stream. The reaction mixture was filtered, and the filter cake was washed successively with acetone and methanol and dried to obtain 28 parts of a chlorogallium phthalocyanine crystal. The powder X-ray diffraction pattern of the resulting chlorogallium phthalocyanine crystal is shown in FIG. 2.

EXAMPLE 1

Figure 3:
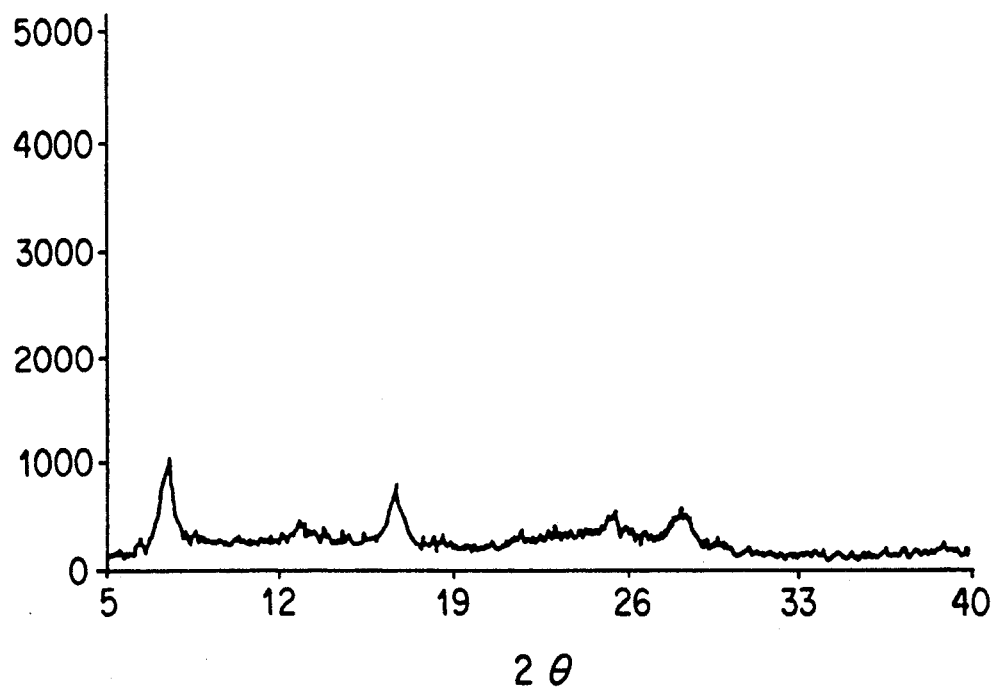
FIG. 3 is a powder X-ray diffraction pattern of amorphous powder of chloroindium phthalocyanine and chlorogallium phthalocyanine obtained in Example 1.

Five parts of the chloroindium phthalocyanine crystal obtained in Synthesis Example 1 and 5 parts of the chlorogallium phthalocyanine obtained in Synthesis Example 2 were mixed and ground in an automatic mortar ("LABO-MILL UT-21" manufactured by Yamato Kagaku) for 10 hours. The powder X-ray diffraction pattern of the resulting amorphous powder is shown in FIG. 3.

EXAMPLE 2

Figure 4:
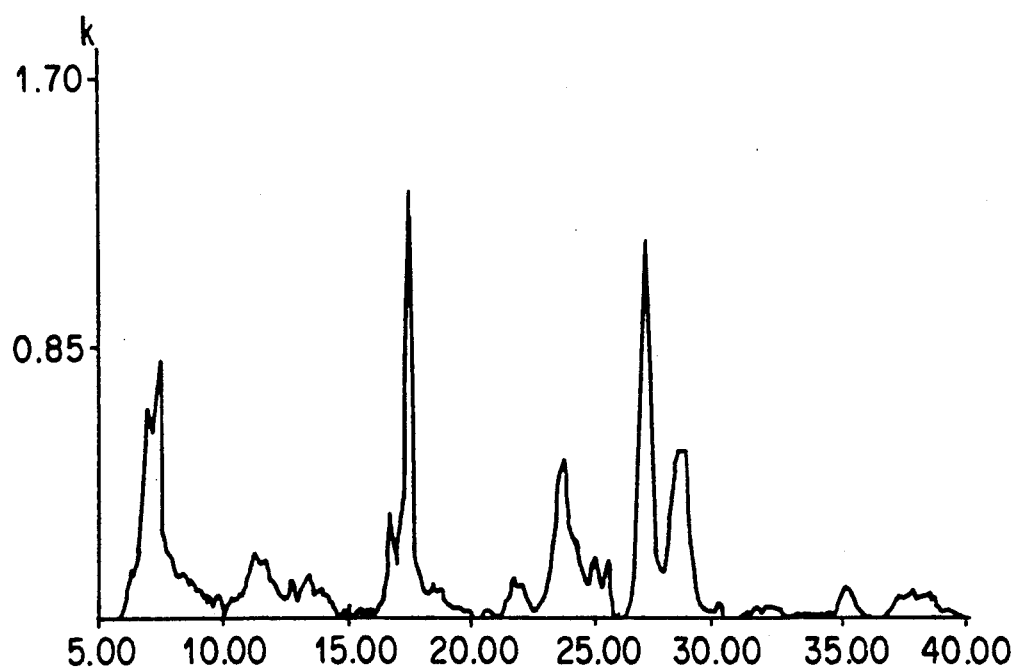
FIGS. 4 and 5 are each a powder X-ray diffraction pattern of a chloroindium phthalocyanine-chlorogallium phthalocyanine mixed crystal obtained in Examples 2 and 3, respectively.

In a 100 ml-volume glass container were put 0.5 part of the amorphous powder obtained in Example 1 and 15 ml of methylene chloride together with 30 g of glass beads (diameter: 1 mm), and the mixture was subjected to milling at 150 rpm for 24 hours. The crystals were collected by filtration and dried to obtain 0.4 part of a chloroindium phthalocyanine-chlorogallium phthalocyanine mixed crystal. The powder X-ray diffraction pattern of the resulting mixed crystal is shown in FIG. 4.

EXAMPLES 3 TO 8

The amorphous powder obtained in Example 1 was treated with the solvent shown in Table 1 below in the same manner as in Example 2. The Figure No. of the powder X-ray diffraction pattern of the resulting mixed crystal is shown in the Table.

TABLE 1

Figure 5:
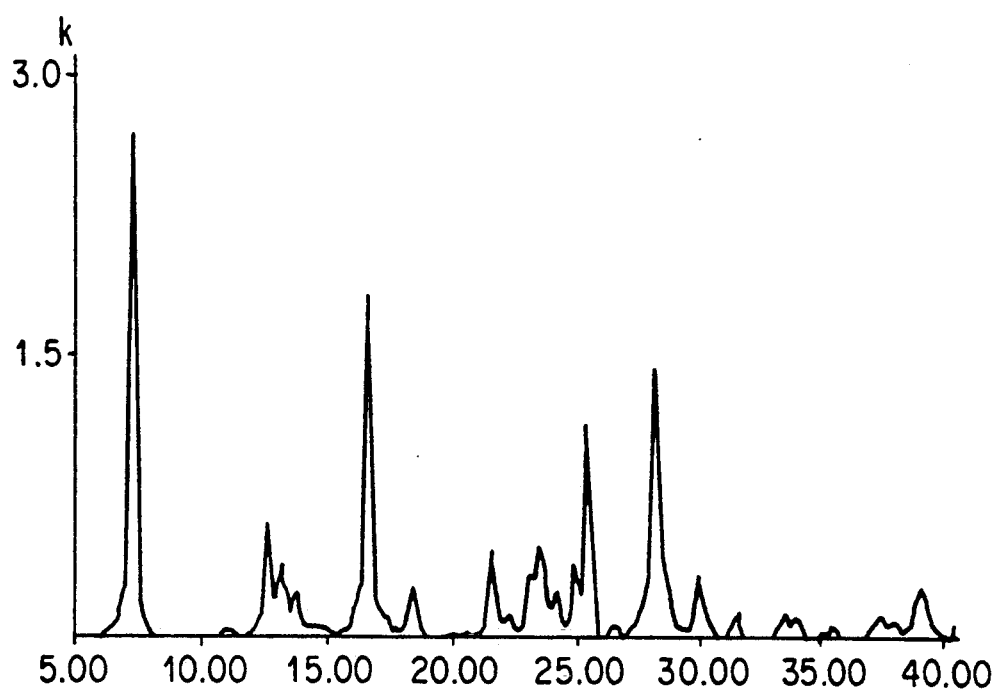

| Example No. | Solvent | Powder X-ray Diffraction Pattern |
| --- | --- | --- |
| 3 | monochlorobenzene | FIG. 5 |
| 4 | THF | the same as FIG. 5 |
| 5 | methyl ethyl ketone | the same as FIG. 5 |
| 6 | ethylene glycol | the same as FIG. 5 |
| 7 | DMF | the same as FIG. 5 |
| 8 | water/monochlorobenzene = 1/14 | the same as FIG. 5 |

COMPARATIVE EXAMPLE 1

Figure 6:
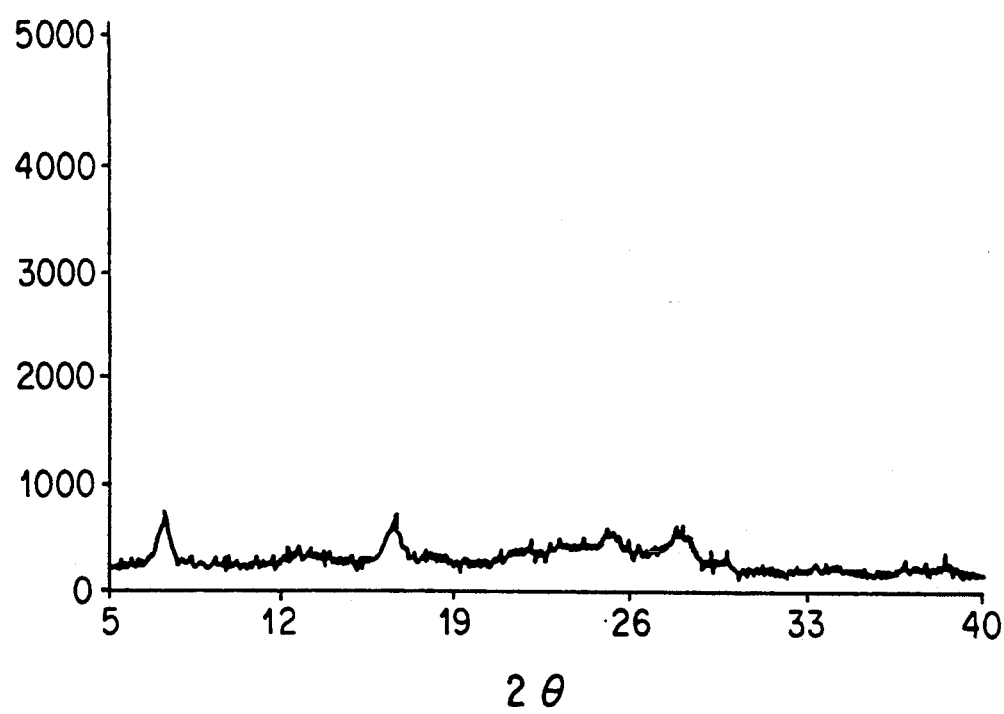
FIG. 6 is a powder X-ray diffraction pattern of a chloroindium phthalocyanine crystal obtained in Comparative Example 1.

Ten parts of the chloroindium phthalocyanine crystal obtained in Synthesis Example 1 were subjected to grinding in the same manner as in Example 1. The powder X-ray diffraction pattern of the resulting powder is shown in FIG. 6.

COMPARATIVE EXAMPLE 2

Figure 7:
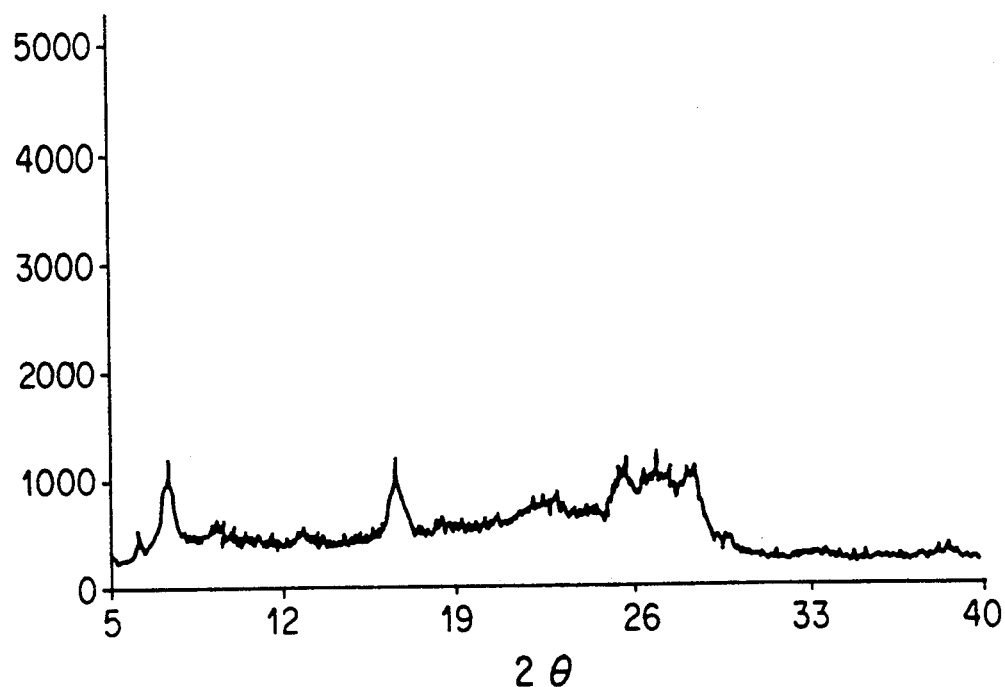
FIG. 7 is a powder X-ray diffraction pattern of a chlorogallium phthalocyanine crystal obtained in Comparative Example 2.

Ten parts of the chlorogallium phthalocyanine crystal obtained in Synthesis Example 2 were subjected to grinding in the same manner as in Example 1. The powder X-ray diffraction pattern of the resulting powder is shown in FIG. 7.

COMPARATIVE EXAMPLES 3 TO 8

The ground crystal obtained in Comparative Example 1 or 2 was treated with the solvent shown in Table 2 below in the same manner as in Example 2. The Figure No. of the powder X-ray diffraction pattern of the resulting crystal is shown in the Table.

TABLE 2

Figure 8:
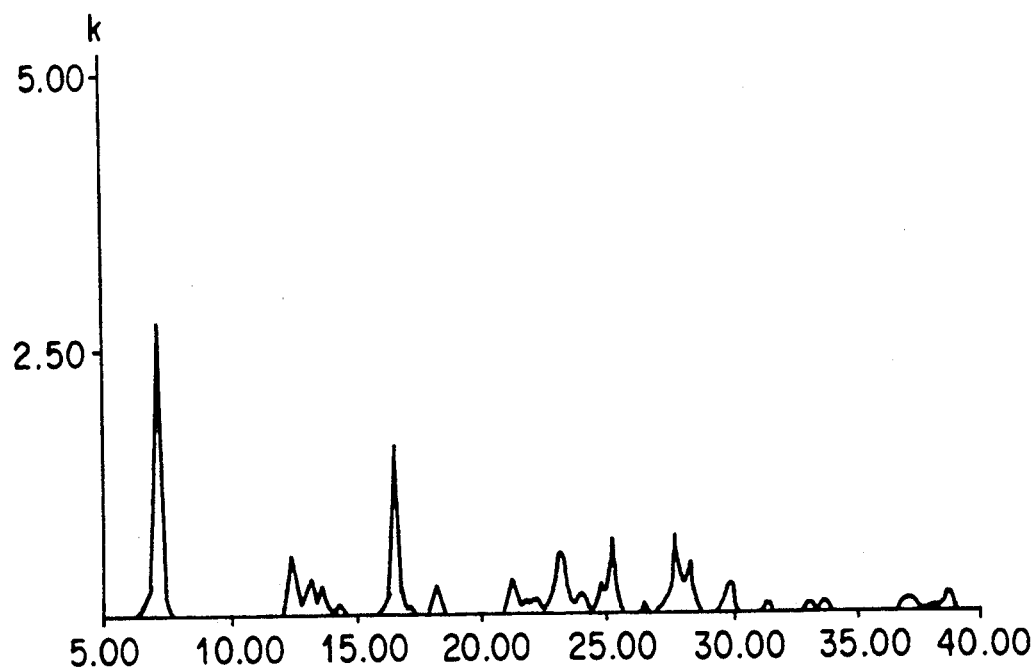
FIGS. 8 and 9 are each a powder X-ray diffraction pattern of a chloroindium phthalocyanine crystal obtained in Comparative Examples 3 and 5, respectively.
Figure 9:
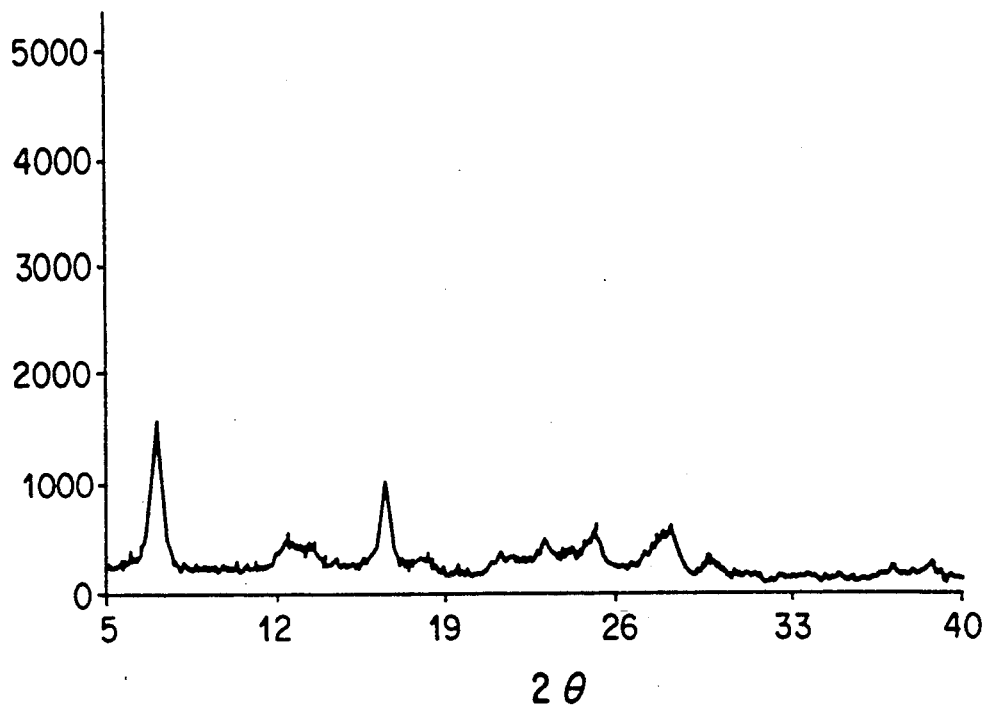
Figure 10:
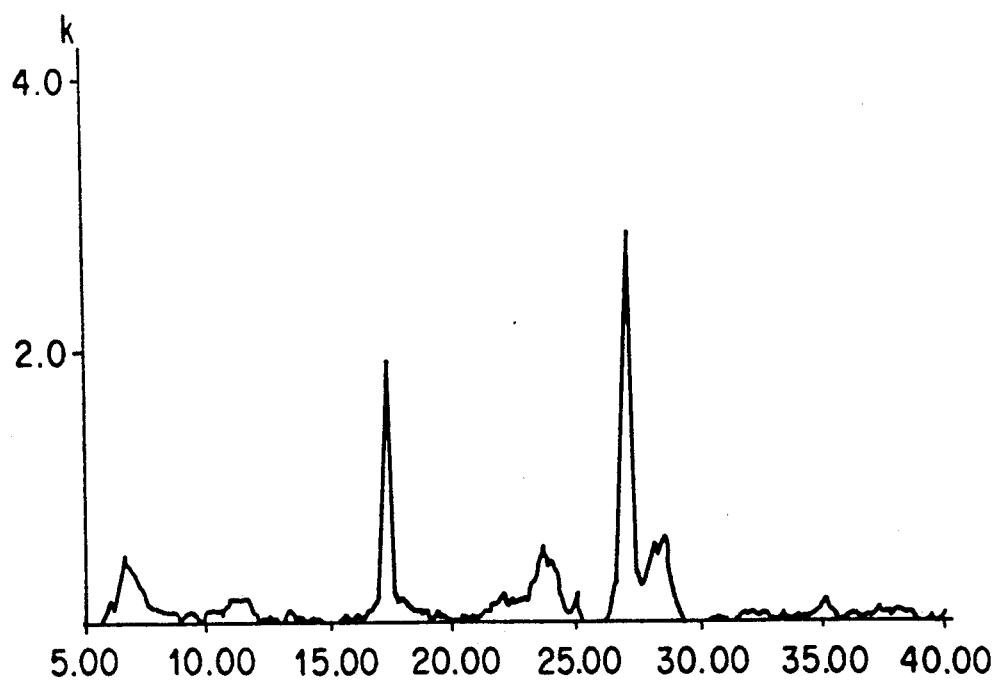
FIGS. 10, 11 and 12 are each a powder X-ray diffraction pattern of chlorogallium phthalocyanine crystal obtained in Comparative Examples 6, 7, and 8, respectively.
Figure 11:
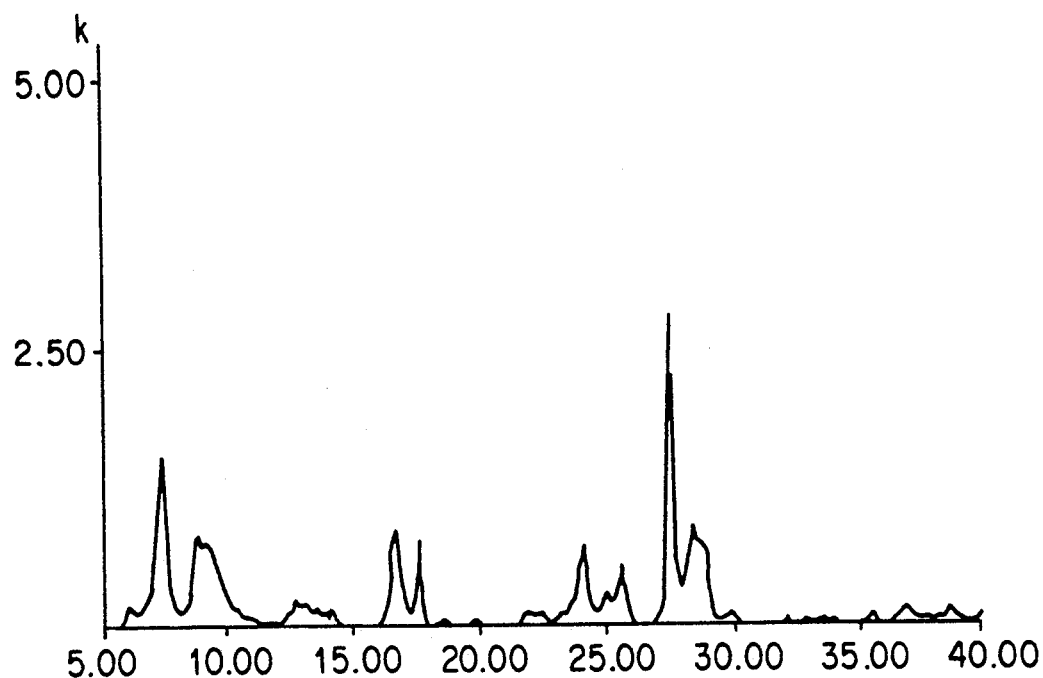
Figure 12:
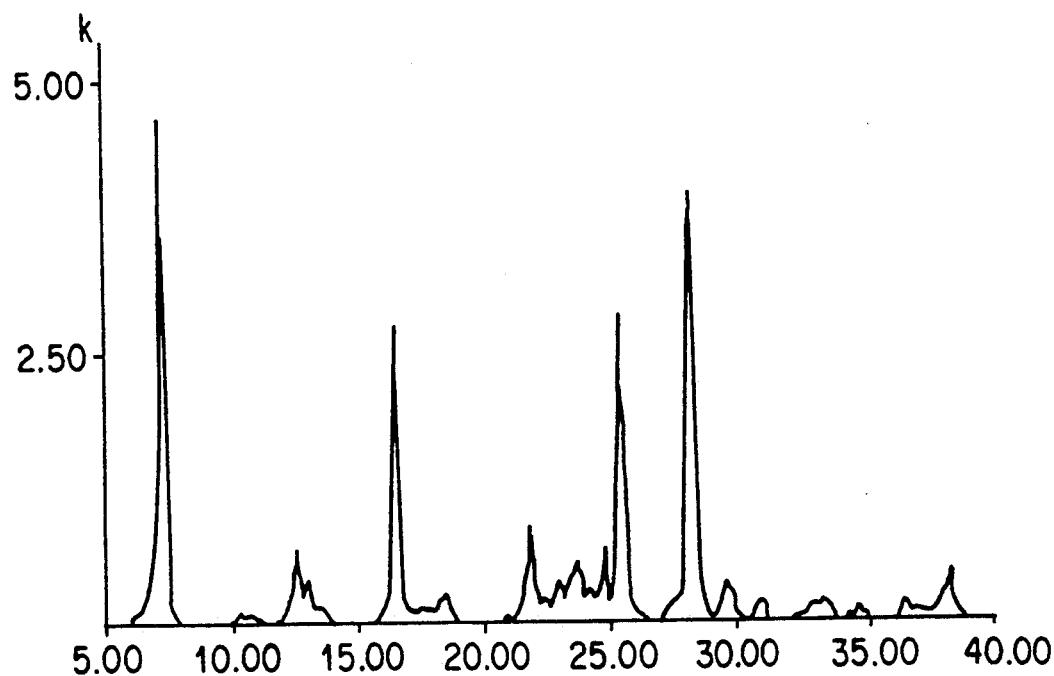

| Comparative Example No. | Crystal to be Treated | Solvent | X-ray Diffraction Pattern |
| --- | --- | --- | --- |
| 3 | Comparative Example 1 | methylene chloride | FIG. 8 |
| 4 | Comparative Example 1 | monochlorobenzene | the same as FIG. 8 |
| 5 | Comparative Example 1 | ethylene glycol | FIG. 9 |
| 6 | Comparative Example 2 | methylene chloride | FIG. 10 |
| 7 | Comparative Example 2 | ethylene glycol | FIG. 11 |
| 8 | Comparative Example 2 | water/monochlorobenzene = 1/14 | FIG. 12 |

EXAMPLE 9

A coating composition comprising 10 parts of an organozirconium compound ("ORGATICS ZC540" produced by Matsumoto Seiyaku K.K.), 2 parts of a silane coupling agent ("A1110" produced by Nippon Unicar K.K.), 30 parts of isopropyl alcohol, and 30 parts of n-butanol was coated on an aluminumplated substrate by dip coating and dried at 150° C. for 5 minutes to form a 0.1 μm thick subbing layer.

A mixture of 0.1 part of the chloroindium phthalocyaninechlorogallium phthalocyanine mixed crystal obtained in Example 2, 0.1 part of polyvinyl butyral ("S-Lec BM-S" produced by Sekisui Chemical Co., Ltd.), and 10 parts of cyclohexanone was dispersed in a paint shaker together with glass beads for 1 hour to prepare a coating composition. The resulting coating composition was coated on the subbing layer by dip coating and dried at 100° C. for 5 minutes to form a 0.2 μm thick charge generating layer.

In 8 parts of monochlorobenzene were dissolved 1 part of a compound of formula (1) shown below and 1 part of poly(4,4-cyclohexylidenediphenylene carbonate) of formula (2) shown below, and the resulting coating composition was coated on the charge generating layer by dip coating and dried at 120° C. for 1 hour to form a 15 μm thick charge transporting layer.

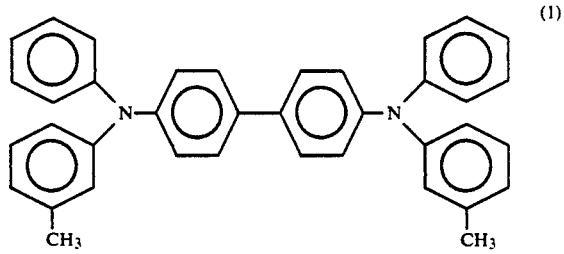

(1)

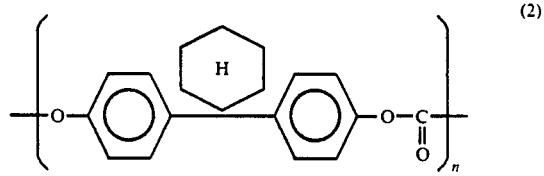

(2)

Electrophotographic characteristics of the resulting electrophotographic photoreceptor were evaluated by making the following measurements with a flat plate scanner under a normal temperature and normal humidity condition (20° C., 40% RH). The results obtained are shown in Table 3 below.

1) Initial Surface Potential ($V_{DDP}$):

The photoreceptor was charged to $-6.0$ kV by a corona discharge, and the surface potential after 1 second ($V_{DDP}$) was measured.

2) Decay Rate (dV/dE):

The negatively charged photoreceptor was exposed to monochromatic light (780 nm) isolated through a band transmission filter to determine a decay rate of the potential (dV/dE).

3) Residual Potential ($V_{RP}$):

The photoreceptor was exposed to white light of 50 erg/cm² for 0.5 second, and the residual surface potential ($V_{RP}$) was measured.

4) Durability:

The above-described charging and exposure were repeated 1000 times, and $V_{DDP}$ and $V_{RP}$ were measured to obtain a difference from those in the initial stage ($\Delta V_{DDP}$, $\Delta V_{RP}$).

EXAMPLES 10 TO 15 AND COMPARATIVE EXAMPLES 9 TO 14

An electrophotographic photoreceptor was produced in the same manner as in Example 9, except for replacing the chloroindium phthalocyanine-chlorogallium phthalocyanine mixed crystal of Example 2 with the charge generating material shown in Table 3. The resulting photoreceptor was evaluated in the same manner as in Example 9, and the results obtained are shown in Table 3.

TABLE 3

| Example No. | Charge Generating Material | Initial Electrophotographic Characteristics | | | Durability | |
| --- | --- | --- | --- | --- | --- | --- |
| | | $V_{DDP}$ (V) | dV/dE (Vcm²/erg) | $V_{RP}$ (V) | $\Delta V_{DDP}$ (V) | $\Delta V_{RP}$ (V) |
| Example | Example 2 | −520 | 90 | −15 | 20 | 15 |

TABLE 3-continued

| Example No. | Charge Generating Material | Initial Electrophotographic Characteristics | | | Durability | |
|---|---|---|---|---|---|---|
| | | $V_{DDP}$ (V) | dV/dE (Vcm$^2$/erg) | $V_{RP}$ (V) | $\Delta V_{DDP}$ (V) | $\Delta V_{RP}$ (V) |
| Example 10 | Example 3 | −510 | 85 | −20 | 25 | 15 |
| Example 11 | Example 4 | −515 | 85 | −20 | 25 | 15 |
| Example 12 | Example 5 | −520 | 90 | −15 | 20 | 10 |
| Example 13 | Example 6 | −530 | 105 | −10 | 15 | 10 |
| Example 14 | Example 7 | −535 | 110 | −10 | 15 | 10 |
| Example 15 | Example 8 | −520 | 85 | −20 | 25 | 15 |
| Comparative Example 9 | Comparative Example 3 | −520 | 60 | −30 | 50 | 15 |
| Comparative Example 10 | Comparative Example 4 | −500 | 65 | −25 | 50 | 15 |
| Comparative Example 11 | Comparative Example 5 | −430 | 80 | −20 | 40 | 10 |
| Comparative Example 12 | Comparative Example 6 | −520 | 62 | −15 | 25 | 15 |
| Comparative Example 13 | Comparative Example 7 | −470 | 50 | −18 | 30 | 20 |
| Comparative Example 14 | Comparative Example 8 | −500 | 58 | −20 | 30 | 20 |

The phthalocyanine mixed crystal according to the present invention, which comprises a halogenated indium phthalocyanine and a halogenated gallium phthalocyanine in a novel crystal form, serves as an excellent charge generating material to provide a highly reliable electrophotographic photoreceptor having high sensitivity, excellent stability on repeated use, and excellent environmental stability.

While the invention has been described in detail and with reference to specific examples thereof, it will be apparent to one skilled in the art that various changes and modifications can be made therein without departing from the spirit and scope thereof.

What is claimed is:

1. A phthalocyanine mixed crystal comprising a halogenated indium phthalocyanine and a halogenated gallium phthalocyanine.

2. A phthalocyanine mixed crystal as claimed in claim 1, wherein said mixed crystal has distinct X-ray diffraction peaks at Bragg angle (2θ±0.2°) of 7.0°, 7.4°, 17.4°, 23.7°, and 27.0°.

3. A phthalocyanine mixed crystal as claimed in claim 1, wherein said mixed crystal has distinct X-ray diffraction peaks at Bragg angles (2θ±0.2°) of 7.4°, 16.7°, 25.4°, and 28.1°.

4. A phthalocyanine mixed crystal as claimed in claim 1, wherein said halogenated indium phthalocyanine is chloroindium phthalocyanine and said halogenated gallium phthalocyanine is chlorogallium phthalocyanine.

5. A phthalocyanine mixed crystal as claimed in claim 1, comprising a chloroindium phthalocyanine and a chlorogallium phthalocyanine and having distinct X-ray diffraction peaks at Bragg angle (2θ±0.2°) of 7.0°, 7.4°, 17.4°, 23.7° and 27.0° or at Bragg angle (2θ±0.2°) of 7.4°, 16.7°, 25.4° and 28.1°, and wherein said mixed crystal comprises chloroindium phthalocyanine and chlorogallium phthalocyanine in a weight ratio of from 30/70 to 70/30.

6. A phthalocyanine mixed crystal as claimed in claim 5, wherein said mixed crystal comprises chloroindium phthalocyanine and chlorogallium phthalocyanine in a weight ratio of from 40/60 to 60/40.

7. A method of making a phthalocyanine mixed crystal comprising the steps of:
   (a) mixing a halogenated indium phthalocyanine and a halogenated gallium phthalocyanine;
   (b) grinding said mixture to an amorphous composition;
   (c) treating said amorphous composition with an organic solvent; and
   (d) recovering said phthalocyanine mixed crystal from said organic solvent.

8. A method as claimed in claim 7, wherein step (a) comprises mixing a crystalline halogenated indium phthalocyanine and a crystalline halogenated gallium phthalocyanine.

9. A method as claimed in claim 7, wherein said step (d) comprises filtering said treated mixture and recovering said phthalocyanine mixed crystal as a filtrate.

10. A method as claimed in claim 7, wherein said organic solvent comprises a solvent selected from the group consisting of halogenated hydrocarbons, aromatic hydrocarbons, alcohols, ketones, acetic esters, aliphatic hydrocarbons and ethers.

11. A method as claimed in claim 7, wherein said organic solvent comprises a solvent selected from the group consisting of methylene chloride, chloroform, toluene, benzene, chlorobenzene, methanol, ethanol, acetone, methylethyl ketone, ethyl acetate, butyl acetate, hexane, octane, diethyl ether, dioxane, tetrahydrofuran, ethylene glycol, dimethylformamide, mixtures of said solvents and mixtures of said solvents and water.

* * * * *